United States Patent
Nakamura et al.

[11] Patent Number: 5,908,047
[45] Date of Patent: Jun. 1, 1999

[54] THREE-WAY VALVE AND EXHAUST GAS PURIFIER USING THE SAME

[75] Inventors: Hajime Nakamura; Hidetoshi Saito; Satoru Itsuaki; Kunihide Sakaguchi; Shiro Nakajima, all of Itami, Japan

[73] Assignee: Sumitomo Electric Industries, Ltd., Osaka, Japan

[21] Appl. No.: 08/951,472

[22] Filed: Oct. 16, 1997

[30] Foreign Application Priority Data

Oct. 18, 1996 [JP] Japan ..................................... 8-275882

[51] Int. Cl.⁶ .................................................. F16K 11/04
[52] U.S. Cl. ........................ 137/875; 137/625.44; 251/86
[58] Field of Search .............. 137/625.44, 875; 251/86

[56] References Cited

U.S. PATENT DOCUMENTS

| | | | |
|---|---|---|---|
| 3,521,659 | 7/1970 | Seger | ............................. 137/625.44 X |
| 4,386,497 | 6/1983 | Takagi et al. | . |
| 5,167,257 | 12/1992 | Erpenbeck | ................ 137/875 |

FOREIGN PATENT DOCUMENTS

| | | |
|---|---|---|
| 2095805 | 2/1972 | France . |
| 2701292 | 8/1994 | France . |
| 56-92318 | 7/1981 | Japan . |
| 58-51235 | 3/1983 | Japan . |
| 04088271 | 3/1992 | Japan . |
| 07224633 | 8/1995 | Japan . |
| 7-224633 | 8/1995 | Japan . |
| WO89/03929 | 5/1989 | WIPO . |

*Primary Examiner*—John Fox
*Attorney, Agent, or Firm*—McDermott, Will & Emery

[57] ABSTRACT

A three-way valve for changing over the direction of flow of high-temperature gas which can completely close flow paths and which is durable enough to prevent increase in leakage of gas even if the gas is engine exhaust. A valve mechanism provided in a valve chest includes an arm pivotable about a pivot shaft, a support rod mounted on a valve pressing portion of the arm, and two valve bodies supported on the support rod on both sides of the arm so as to be pivotable. The valve bodies have flat sealing surfaces adapted to be brought into surface-to-surface contact with flat valve seats formed at the inlets of bifurcated paths.

3 Claims, 6 Drawing Sheets

THREE-WAY VALVE AND EXHAUST GAS PURIFIER USING THE SAME

BACKGROUND OF THE INVENTION

This invention relates to a three-way valve for changing over the flow of high-temperature gas containing corrosive components and/or particulate-matter, such as exhaust gas from an engine, and an engine exhaust gas purifier having such a valve.

Emissions from a diesel engine contain various components that can cause air pollution. One of such components is combustible particulate material (hereinafter called PM) mainly comprising carbon. Various improvements on engines have of course been proposed to remove PM. But as means for removing PM more reliably, an exhaust purifier having a trapper (as disclosed in unexamined Japanese patent publication 58-51235) mounted in the exhaust line of an engine to trap PM is proposed. Some of such trappers are actually already used in commercial cars.

Trappers need periodical regeneration in which trapped PM is removed by burning. It is difficult to burn PM while exhaust is being introduced from the engine. But stopping the engine for regeneration is impractical. Thus, it is an ordinary practice to bifurcate the exhaust line and mount two trappers in the respective bifurcated paths of the exhaust line so that either one of the trappers can be regenerated while exhaust is being directed to the other trapper.

This arrangement requires a valve capable of selectively closing one of the bifurcated paths of the exhaust line in which the trapper is to be regenerated, while directing exhaust only into the other bifurcated path. For such a valve, an ordinary on-off valve or changeover valve is useless because engine exhaust is a high-temperature corrosive gas and no lubricant such as lubricating oil cannot be used in such a gas.

To solve this problem, unexamined Japanese patent publication 56-92318 proposes a particulate trapping device having a flap valve provided in the exhaust line at the branch point of the two bifurcated paths, the flap valve selectively closing one of the bifurcated paths by pivoting about a pivot axis.

Unexamined Japanese patent publication 7-224633 discloses an exhaust purifier having a three-way valve capable of changing over the flow of exhaust gas. As shown in FIG. 6, this three-way valve comprises an arm 33 pivotable about a pivot axis provided at the branch point of two bifurcated paths 31, 32, and two valve bodies 35 having spherical sealing surfaces 34 facing away from each other. By pivoting the arm 33 in either direction, one of the valve bodies 35 abuts the edges of the opening of one of the bifurcated paths.

These conventional valves can quickly open and close the openings of the bifurcated paths. But since the path in which the trapper to be regenerated is mounted is closed, PM may be burned incompletely due to shortage of oxygen. To prevent incomplete burning, unexamined Japanese patent publication 56-92318 proposes to form orifices in the flap valve so that part of exhaust gas flows into the path in which the trapper is being regenerated. For the same purpose, unexamined Japanese patent publication 7-224633 proposes to provide air supply means to forcibly supply air from outside into the bifurcated path in which the trapper is being regenerated.

The device disclosed in unexamined Japanese patent publication 56-92318 has a problem in that seal between the flap valve and the trapper case seal is insufficient. Due to insufficient seal, exhaust gas will flow not only through the orifices but through the sealed portions into the bifurcated path in which the trapper is being regenerated. This makes the control of oxygen supply difficult. Since the oxygen supply is unstable, PM is burned unstably, so that the trapper tends to be regenerated unstably and unevenly.

In the device disclosed in unexamined Japanese patent publication 7-224633, the passage is closed by bringing a spherical sealing surface into line contact with the edge of the inlet of the bifurcated path. Thus, the surface pressure at the sealing portion is large. This increases the possibility of damaging the sealing surface of the valve body and the edge of the mating member. Also, because of line contact, the sealing properties tend to deteriorate due to inaccurate finish of the spherical sealing surface, corrosion of the sealing surface by exhaust gas, or floating of the sealing surface due to accumulation of PM.

An object of this invention is to provide a three-way valve which is free of such problems of prior art devices and which is high in sealing reliability, and to provide an exhaust purifier in which is used this valve.

SUMMARY OF THE INVENTION

According to this invention, there is provided a three-way valve for selectively directing gas from a main path into one of first and second bifurcated paths by changing over the state of connection, the three-way valve comprising an arm pivotable about an axis located between the first and second bifurcated paths, the arm having a valve pressing portion, a support rod mounted on the valve pressing portion of the arm, two valve bodies supported on the support rod with their backs in contact with one and the other side of the arm so as to be pivotable in every direction, and flat valve seats provided at inlets of the first and second bifurcated paths, each of the valve bodies having a flat seal surface capable of making surface-to-surface contact with the respective valve seat, whereby the first bifurcated path is closed by one of the valve bodies when the arm is pivoted in one direction, whereas the second bifurcated path is closed by the other of the valve bodies when the arm is pivoted in an opposite direction.

Preferably, the arm and the valve bodies are in spherical surface contact with each other.

According to this invention, there is also provided an exhaust gas purifying device provided in an exhaust line of an engine and comprising the three-way valve described above, first and second bifurcated pipes provided downstream of the three-way valve and adapted to be alternately opened and closed by the three-way valve, and trappers mounted in the first and second bifurcated pipes for trapping combustible particles contained in exhaust gas from the engine and periodically burning the trapped particles.

To improve regenerating performance, the exhaust gas purifying device may further comprise air supply means provided between the three-way valve and the trappers for supplying air at a constant rate into one of the bifurcated pipes from outside when the bifurcated pipe is closed by the three-way valve. For the same purpose, the valve bodies of the three-way valve may be formed with orifices through which part of exhaust gas flows into one of the bifurcated pipe while the bifurcated pipe is closed by the three-way valve.

In the three-way valve according to the invention, the sealing surfaces of the valve bodies and the valve seats are both flat. The valve bodies and the valve seats thus make surface-to-surface contact with each other. This allows complete sealing of the passage. Also, the sealing surface is more resistant to corrosion than conventional sealing surfaces, which are adapted to make line contact with the valve seats. Further, due to large sealing area, PM stuck on the sealing surface will have little influence on the sealing properties. In the arrangement in which the arm and the valve bodies are in spherical surface contact with each other, the valve bodies can pivot freely in every direction, so that uniform pressure is applied to the entire sealing surface. Thus, a stable sealing is achieved.

In the exhaust purifier according to this invention, in which is used the three-way valve according to the invention, it is possible to close the bifurcated pipe in which the trapper is being regenerated with high reliability. Thus, both in the arrangement in which air is introduced into the closed bifurcated pipe from outside to promote burning of PM and in the arrangement in which orifices are formed in the valve bodies to let part of exhaust gas flow into the closed bifurcated pipe to promote burning of PM, air or exhaust gas can be supplied at a constant rate. This makes it possible to uniformly burn PM at a uniform temperature. The trappers can thus be regenerated uniformly.

The latter arrangement needs no air supply means, so that it is possible to simplify the structure of the entire device.

Other features and objects of the present invention will become apparent from the following description made with reference to the accompanying drawings, in which:

DETAILED DESCRIPTION OF THE PREFERRED EMBODIMENT

Figure 1:
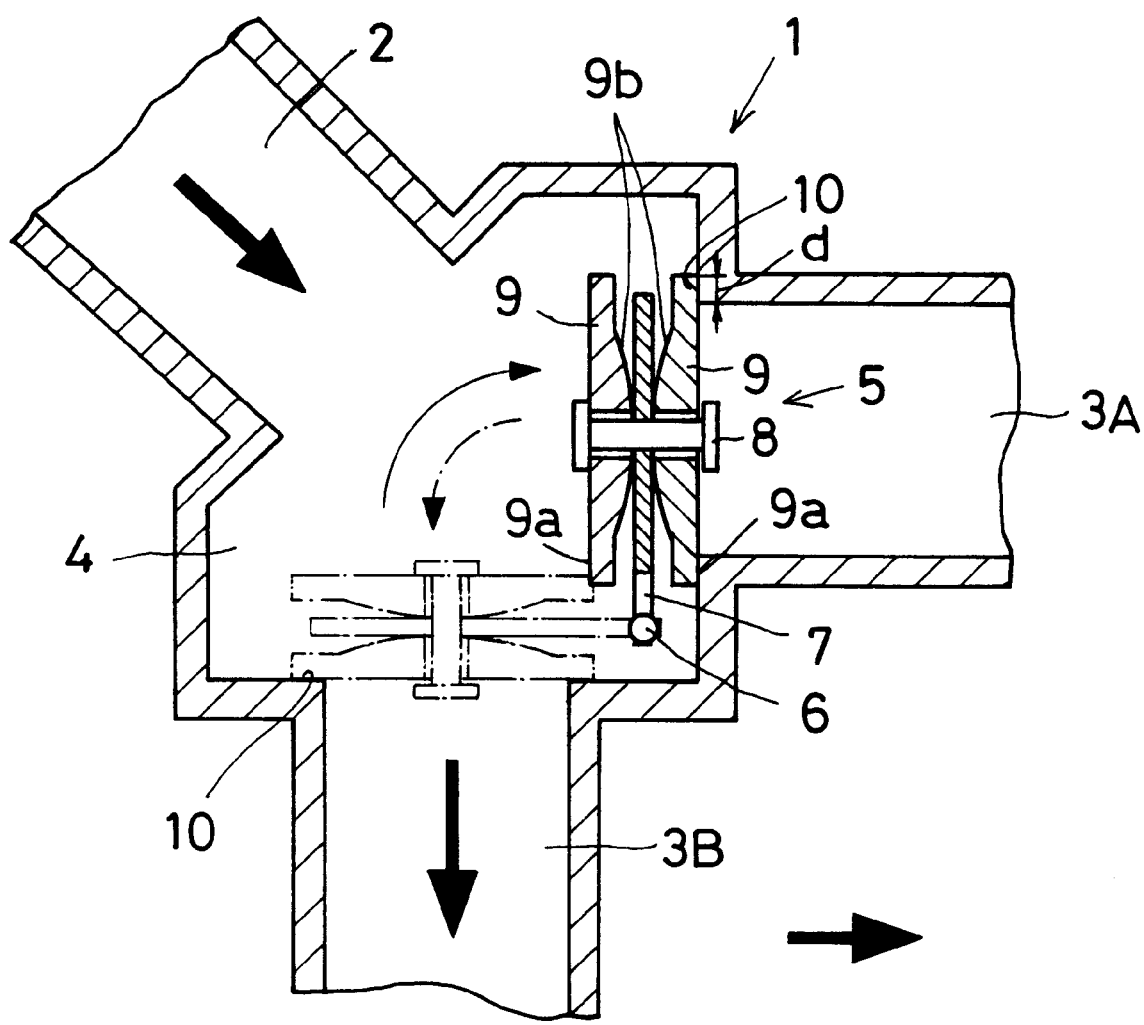
FIG. 1 is a sectional view of a three-way valve embodying this invention.

FIG. 1 shows a three-way valve embodying this invention. This three-way valve 1 has a valve chest 4 provided between a main path 2 and bifurcated paths 3A, 3B (the letters A, B attached to distinguish two identical elements). A valve assembly 5 is mounted in the valve chest 4. The valve assembly 5 comprises an externally controllable pivot shaft 6 disposed between the paths 3A, 3B, an arm 7 having one end thereof fixed to the pivot shaft 6, a support rod 8 extending through a valve pressing portion of the arm 7 (the portion in alignment with the axis of each bifurcated path), and two valve bodies 9 mounted on the support rod 8 on both sides of the arm 7.

The valve bodies 9 are made of a metallic, ceramic or any other heat-resistant material. Because a play is present between each valve body 9 and the support rod 8, each valve body 9 can pivot in all directions with its spherical convex back surface 9b in contact with the surface of the valve pressing portion of the arm. Each valve body 9 is further formed with a flat sealing surface 9a adapted to be brought into surface-to-surface contact with a flat valve seat 10 formed along the edge of the opening of each bifurcated path 3A, 3B.

The contact width d between the sealing surface 9a and valve seat 10 is preferably 1 mm or over. If the contact width is less than 1 mm, the contact is practically no different from line contact, so that the advantage of the invention will lessen.

When the pivot shaft 6 is turned counterclockwise with the valve bodies 9 in the position shown by solid line, the arm 7 will pivot and the valve bodies 9 move to the position shown by chain line. Gas thus flows from the main path into the bifurcated path 3A. When the pivot shaft 6 is turned in the opposite direction in this state, the valve body 9 returns to the position shown by chain line, so that gas now flows from the main path into the bifurcated path 3B.

One of the bifurcated paths is closed by the surface-to-surface contact between one of the sealing surfaces 9a and the valve seat 10. Since the valve bodies 9 are freely pivotable, the sealing surface pressure is uniform over the entire area. Thus, the leakage of gas through the sealing portion is kept to zero or near zero. If the gas is exhaust gas, PM contained in the gas may stick to the sealing surfaces 9a and the valve seats 10. Such PM will be crushed by being sandwiched between the sealing surfaces 9a and the valve seats 10. The crushed PM serves as a kind of sealing material, thus improving, rather than deteriorating the seal therebetween.

Figure 2:
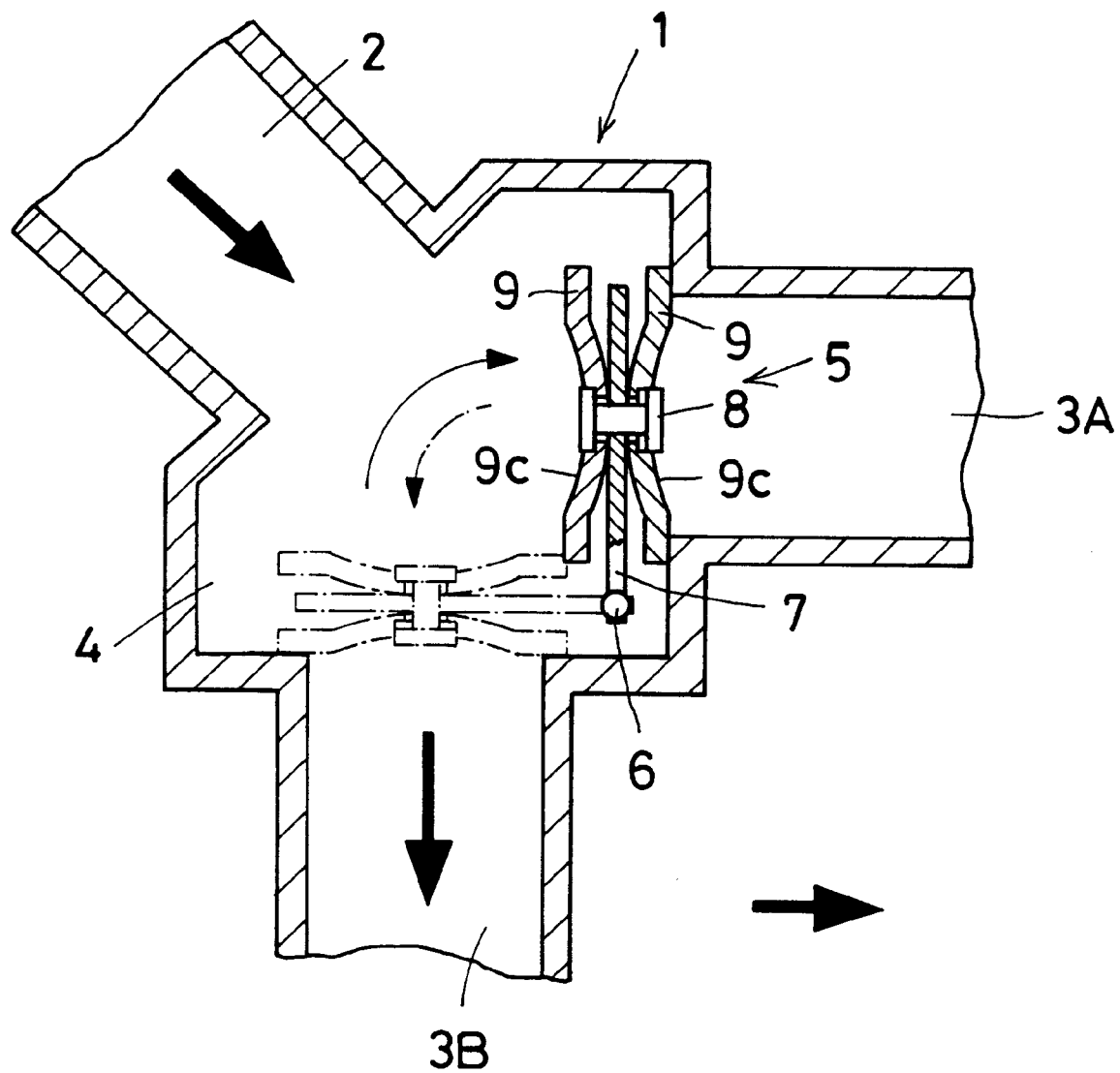
FIG. 2 is a sectional view of a three-way valve having valve bodies formed with gas guiding recesses.

FIG. 2 is the second embodiment. Each valve body 9 of this embodiment has a spherical concave recess 9c. Guided by the recess 9c, gas can smoothly flow from the main path into the open bifurcated path. This embodiment is otherwise the same as the FIG. 1 embodiment.

Figure 3:
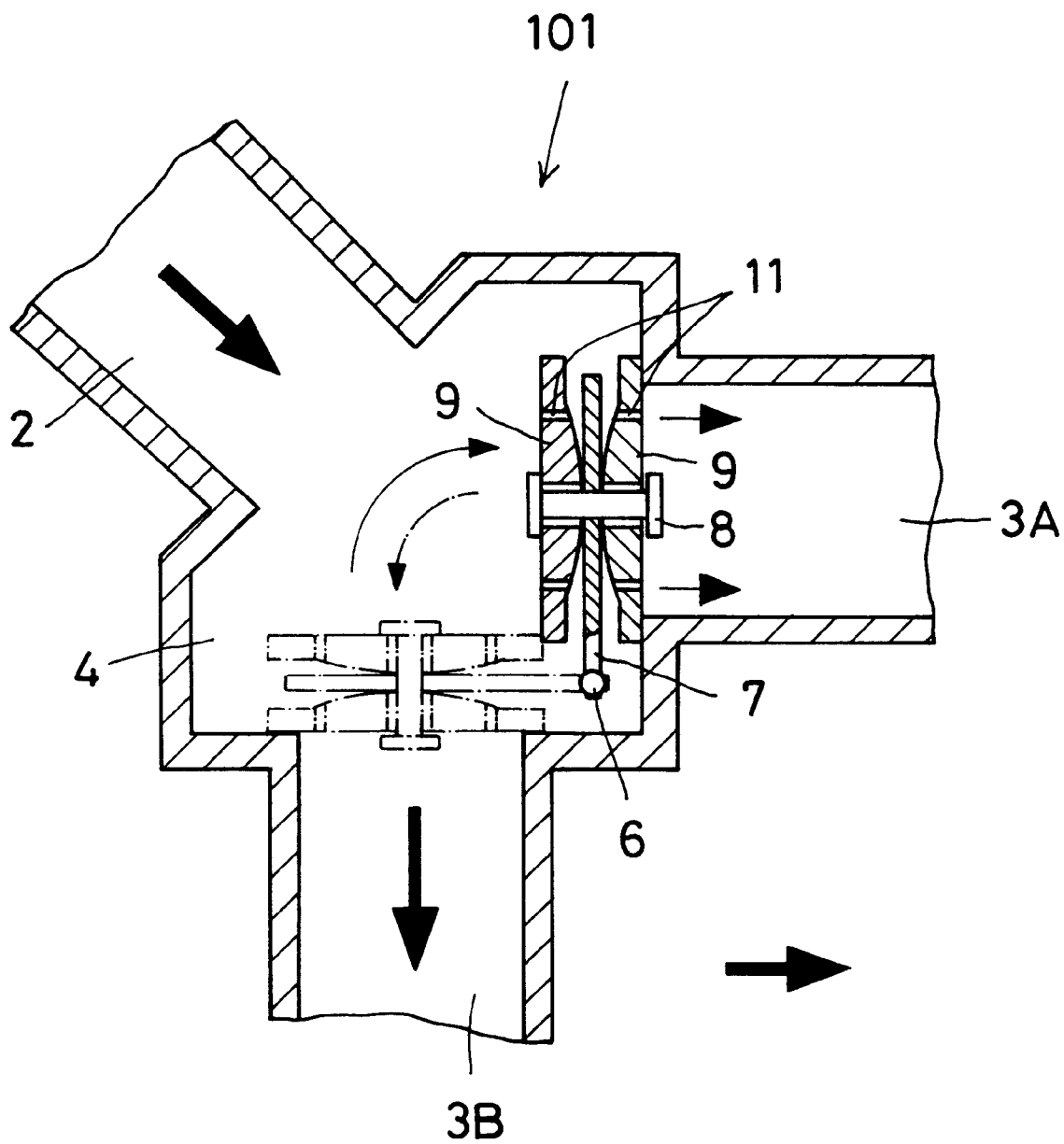
FIG. 3 is a sectional view of a three-way valve having valve bodies formed with orifices.

In the embodiment of FIG. 3, orifices 11 are formed in the valve bodies 9 of FIG. 1. This three-way valve 101 is used when it is necessary to direct part of the exhaust gas from the main path into the closed bifurcated path. The positions of such orifices, and their number and size are determined so that a required amount of exhaust gas can flow into the closed bifurcated path, taking into account the angles of the bifurcated paths with respect to the main path.

Figure 4:
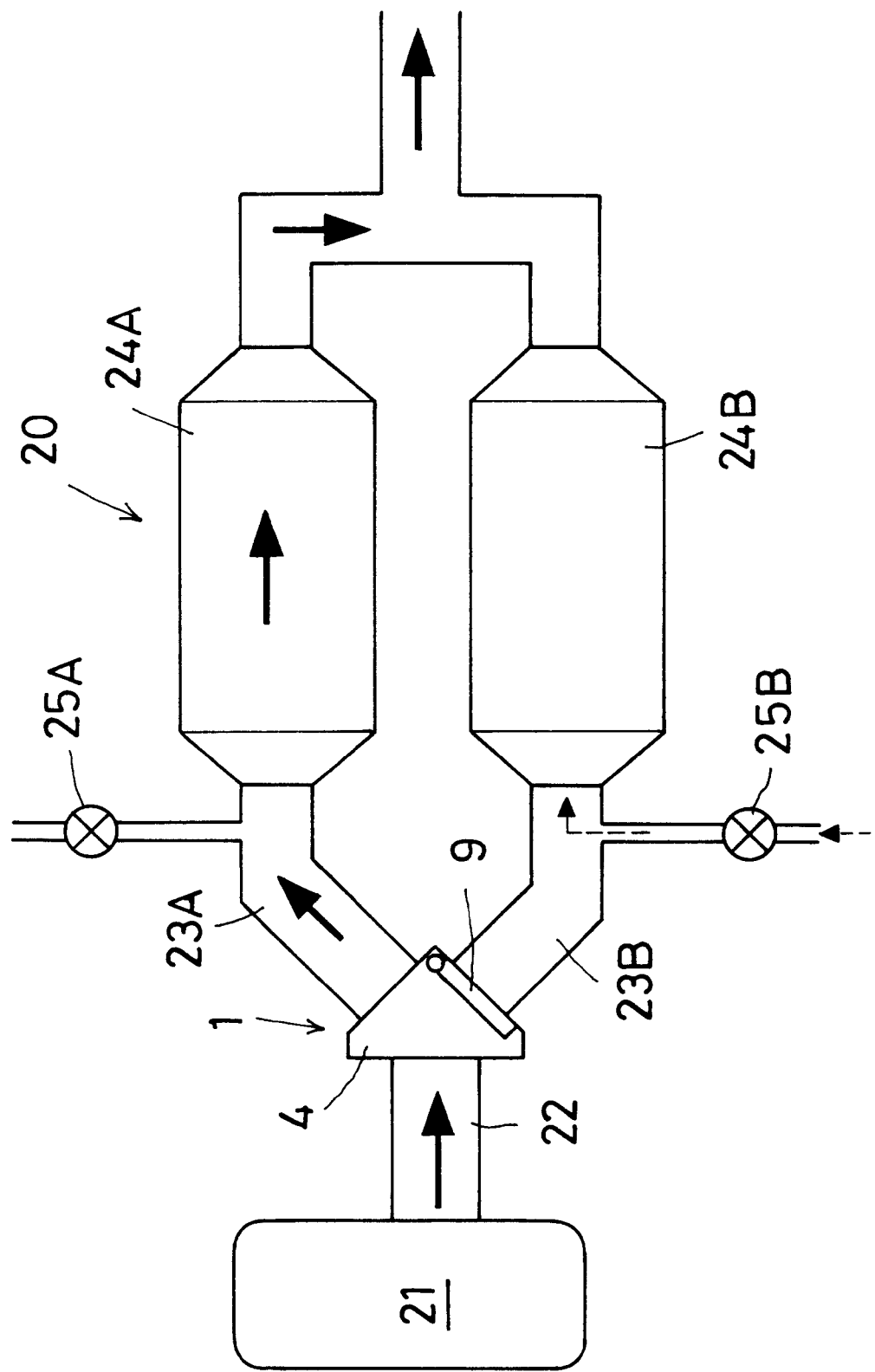
FIG. 4 is a schematic view of an exhaust gas purifier according to this invention in which is used the three-way valve of FIG. 1 or 2.

FIG. 4 shows an example of an exhaust gas purifier 20 in which is used the three-way valve shown in FIG. 1 or 2. Specifically, the three-way valve 1 and the trappers 24A and 24B are mounted in the tailpipe 22 of an engine 21. Trappers 24A, 24B are mounted in bifurcated pipes 23A, 23B, which correspond to the bifurcated paths 3A, 3B of FIGS. 1 and 2. Pipes with on-off valves 25A, 25B are connected to the pipes extending between the three-way valves 1 and the trappers 24A and 24B to supply a predetermined amount of air into the bifurcated pipes 23A, 23B.

Each trapper 24 comprises a PM filter and an electric heater for heating and burning trapped PM, both mounted in a case.

The trappers 24 may have their filters formed from a heat-resistant and corrosion-resistant porous metal or metallic nonwoven fabric. Such filters are high in thermal conductivity and thus are less likely to be destroyed due to heat spots. In some trappers, a plate-shaped heaters are inserted in the space between filters to improve regeneration efficiency. There are still other kinds of trappers. A suitable trapper may be selected from among such conventional ones.

In use, exhaust gas from the engine 21, which may be a diesel engine, flows through the tailpipe 22 into the valve chest 4 and then, if the valve 1 is in the illustrated position, into the bifurcated pipe 23A. PM in the exhaust gas is thus trapped by the trapper 24A. (The valve 25A is closed in this state.) For this while, the other trapper 24B is regenerated. During regeneration, the valve 25B is kept open to promote burning of PM by supplying air at a constant rate into the bifurcated pipe 23B. When the amount of PM trapped by the trapper 24A reaches the limit of its capacity, the three-way valve 1 changes over. The trapper 24A is now regenerated while PM is trapped by the trapper 24B. This cycle is repeated.

Figure 5:
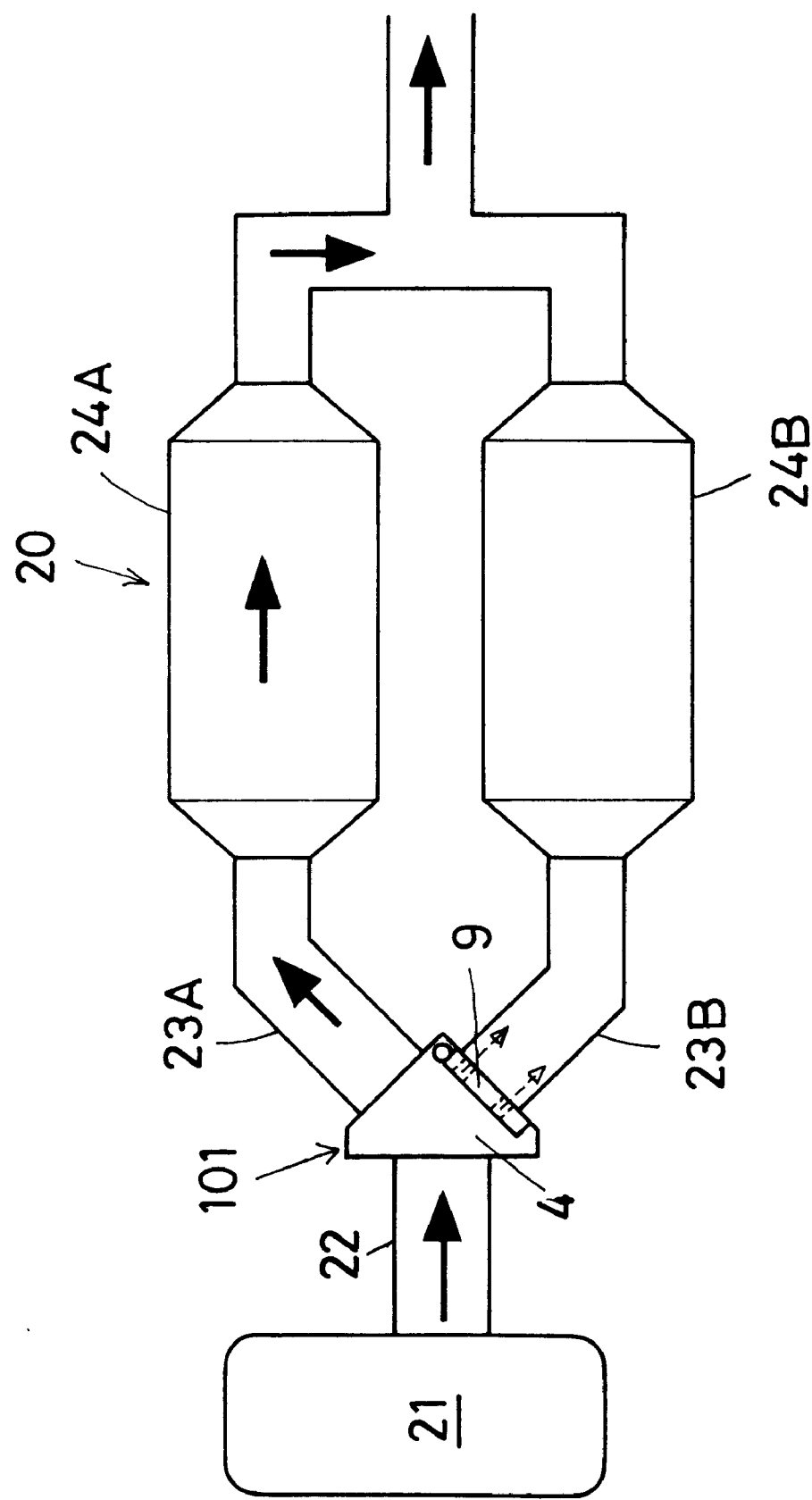
FIG. 5 is a schematic view of an exhaust gas purifier according to this invention which is constructed using the three-way valve of FIG. 3.

FIG. 5 shows a device in which is used the three-way valve 101 of FIG. 3. In this arrangement, the exhaust gas partially flows through the valve into the closed bifurcated pipe. Thus, oxygen in the exhaust gas flowing into the closed bifurcated pipe promotes burning of trapped PM. This makes it possible to omit means for introducing air from outside and thus simplify the structure of the entire device.

EXAMPLE

Figure 6:
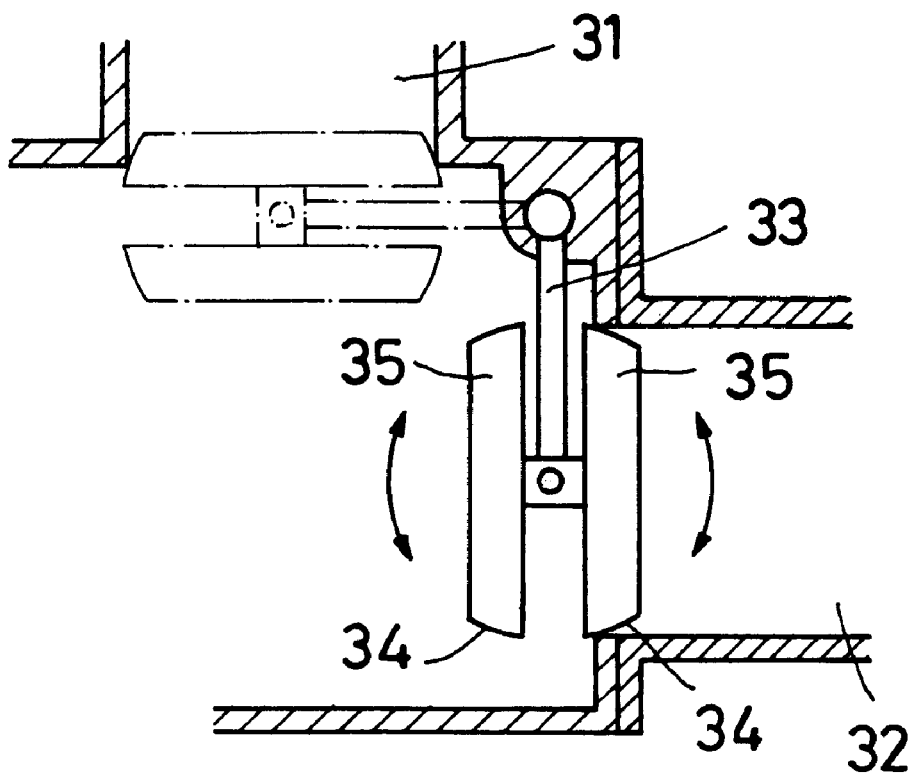
FIG. 6 is a sectional view of a conventional three-way valve.

The three-way valve according to this invention shown in FIG. 2 and the three-way valve disclosed in unexamined Japanese patent publication 7-224633 and shown in FIG. 6 were subjected to a comparison test to check sealing property.

In the test, air was supplied under a pressure of 20 KPa to the respective three-way valves before the valves were actuated to measure the leak rate. The leak rate was 0.1 liter/min. for both valves.

Then, an air cylinder was connected to the pivot axis of the arm of each three-way valve to open and close each valve 10000 times. After the test, air was supplied under 20 KPa. For the comparative article of FIG. 6, the leak rate increased to 0.85 liter/min, while the leak rate of the three-way valve according to this invention was as low as 0.13 liter/min. The sealing properties decreased very little.

As will be apparent from the results of the above experiment, the three-way valve according to this invention is high in sealing properties and durability, because the seal is effected by surface-to-surface contact. This valve is suited for use in an environment where maintenance is difficult.

The exhaust purifier according to this invention, in which is used the three-way valve according to the invention, can burn PM stably, uniformly, reliably and efficiently during the trapper regeneration step.

What is claimed is:

1. A three-way valve for selectively directing gas from a main path into one of first and second bifurcated paths by changing over a state of connection, said three-way valve comprising an arm pivotable about an axis located between said first and second bifurcated paths, said arm having a valve pressing portion, a support rod mounted on said valve pressing portion of said arm, two valve bodies supported on said support rod each valve body having a back surface portion in contact with a respective side of said arm so as to be pivotable in two directions, and flat valve seats provided at inlets of said first and second bifurcated paths, each of said valve bodies formed of a rigid material having a flat seal surface capable of making surface-to-surface contact with said respective valve seat without deformation, wherein said first bifurcated path is closed by one of said valve bodies when said arm is pivoted in a first direction and said second bifurcated path is closed by the other of said valve bodies when said arm is pivoted in direction opposite to said first direction and wherein each said respective side of said arm comprises a flat surface in contact with a spherical surface portion on the back of a respective valve body.

2. A three-way valve as claimed in claim 1 wherein said arm and said valve bodies are in spherical surface contact with each other at said valve pressing portion.

3. A three-way valve as recited in claim 1 wherein said valve bodies of said three-way valve are formed with an orifice through which part of said gas flows into one of said bifurcated paths while said one bifurcated path is closed by said three-way valve.

* * * * *